United States Patent
Love et al.

(10) Patent No.: US 8,280,425 B2
(45) Date of Patent: Oct. 2, 2012

(54) WIRELESS TRANSMITTER CONFIGURATION

(75) Inventors: Robert T. Love, Barrington, IL (US); Armin W. Klomsdorf, Libertyville, IL (US); Bryan S. Nollett, Champaign, IL (US)

(73) Assignee: Motorola Mobility LLC, Libertyville, IL (US)

( * ) Notice: Subject to any disclaimer, the term of this patent is extended or adjusted under 35 U.S.C. 154(b) by 454 days.

(21) Appl. No.: 10/942,570

(22) Filed: Sep. 16, 2004

(65) Prior Publication Data

US 2006/0057978 A1 Mar. 16, 2006

(51) Int. Cl.
*H04B 7/00* (2006.01)

(52) U.S. Cl. ............... 455/522; 455/68; 455/69

(58) Field of Classification Search .......... 455/127.1, 455/69, 550.1, 439, 295, 522, 442, 443, 450, 455/436, 446, 115.1, 103
See application file for complete search history.

(56) References Cited

U.S. PATENT DOCUMENTS

| | | | | |
|---|---|---|---|---|
| 5,001,776 A * | 3/1991 | Clark | .......... | 455/226.2 |
| 5,781,861 A * | 7/1998 | Kang et al. | .......... | 455/442 |
| 5,926,501 A * | 7/1999 | Souissi et al. | .......... | 375/131 |
| 6,061,568 A * | 5/2000 | Dent | .......... | 455/450 |
| 6,337,974 B1 * | 1/2002 | Inamori et al. | .......... | 455/126 |
| 6,501,786 B1 * | 12/2002 | Okamoto | .......... | 375/141 |
| 6,983,166 B2 * | 1/2006 | Shiu et al. | .......... | 455/522 |
| 7,043,263 B2 * | 5/2006 | Kaplan et al. | .......... | 455/466 |
| 7,162,244 B1 * | 1/2007 | Toskala | .......... | 455/436 |
| 7,339,998 B2 | 3/2008 | Murata et al. | | |
| 8,060,127 B2 * | 11/2011 | Anderson | .......... | 455/522 |
| 2002/0009061 A1 * | 1/2002 | Willenegger | .......... | 370/328 |
| 2002/0061764 A1 * | 5/2002 | Kim et al. | .......... | 455/522 |
| 2002/0077141 A1 * | 6/2002 | Hwang et al. | .......... | 455/522 |
| 2002/0115464 A1 * | 8/2002 | Hwang et al. | .......... | 455/522 |
| 2002/0137535 A1 * | 9/2002 | Hunzinger | .......... | 455/522 |
| 2003/0036403 A1 * | 2/2003 | Shiu et al. | .......... | 455/522 |
| 2003/0073409 A1 * | 4/2003 | Nobukiyo et al. | .......... | 455/67.1 |
| 2003/0112855 A1 * | 6/2003 | Margulis et al. | .......... | 375/147 |
| 2003/0123425 A1 * | 7/2003 | Walton et al. | .......... | 370/341 |
| 2003/0194992 A1 * | 10/2003 | Kim et al. | .......... | 455/414.1 |
| 2004/0087325 A1 * | 5/2004 | Cheng et al. | .......... | 455/515 |
| 2004/0131026 A1 * | 7/2004 | Kim et al. | .......... | 370/328 |
| 2004/0132478 A1 * | 7/2004 | Yu | .......... | 455/522 |
| 2004/0147276 A1 * | 7/2004 | Gholmieh et al. | .......... | 455/522 |
| 2004/0162075 A1 * | 8/2004 | Malladi et al. | .......... | 455/442 |

(Continued)

FOREIGN PATENT DOCUMENTS

JP 2003143020 A 5/2003

(Continued)

OTHER PUBLICATIONS

"3GPP TSG-RAN1 #38, Aug. 16-20, 2004, Prague, Czech Republic", Qualcomm Europe, 7 pages.

(Continued)

*Primary Examiner* — Dominic E Rego
(74) *Attorney, Agent, or Firm* — Roland K. Bowler, II

(57) ABSTRACT

A mobile wireless communication terminal changes a transmitter channel configuration, for example, frame size, based on enhanced transport format combination indictor (E-TFCI) information and based on transmit power related information of the wireless communication terminal. In one embodiment, the terminal signals this information to a network infrastructure entity, which re-configures the transmitter channel configuration for the terminal. In another embodiment, the terminal re-configures the transmitter channel configuration.

15 Claims, 2 Drawing Sheets

U.S. PATENT DOCUMENTS

| | | | |
|---|---|---|---|
| 2004/0162097 A1* | 8/2004 | Vijayan et al. | 455/522 |
| 2004/0171401 A1* | 9/2004 | Balachandran et al. | 455/522 |
| 2004/0223455 A1* | 11/2004 | Fong et al. | 370/229 |
| 2004/0233899 A1* | 11/2004 | Vayanos et al. | 370/352 |
| 2004/0235464 A1* | 11/2004 | Korkalo et al. | 455/418 |
| 2005/0117559 A1* | 6/2005 | Malladi et al. | 370/342 |
| 2005/0143018 A1 | 6/2005 | Shinozaki | |
| 2005/0169293 A1* | 8/2005 | Zhang et al. | 370/437 |
| 2005/0169301 A1* | 8/2005 | Jain et al. | 370/464 |
| 2005/0249148 A1* | 11/2005 | Nakamata et al. | 370/328 |
| 2006/0019697 A1* | 1/2006 | Toskala | 455/550.1 |
| 2006/0058051 A1* | 3/2006 | Takano et al. | 455/502 |
| 2006/0068800 A1* | 3/2006 | Ruelke et al. | 455/450 |
| 2006/0189272 A1* | 8/2006 | Willenegger et al. | 455/3.01 |
| 2006/0203782 A1* | 9/2006 | Kwak et al. | 370/335 |
| 2007/0091852 A1* | 4/2007 | Malladi et al. | 370/332 |

FOREIGN PATENT DOCUMENTS

| | | |
|---|---|---|
| JP | 2003304195 A | 10/2003 |
| WO | WO 00/10298 | 2/2000 |
| WO | 2004045239 A2 | 5/2004 |
| WO | 2004066661 A1 | 8/2004 |
| WO | 2004077722 A2 | 9/2004 |

OTHER PUBLICATIONS

Vincent Karam, Project Supervisor Dr. John W. M. Rogers, "A Current Folded Down Conversion Mixer in 0.18μ CMOS", Department of Electronics Carleton University, Ottawa, Canada, Apr. 9, 2003, 45 pages.

Arnab Das, Farooq Khan, Ashwin Sampath, Hsuan-Jung Su; "Performance of Hybrid ARQ for High Speed Downlink Packet Access in UMTS"; IEEE 2001; pp. 2133-2137.

M. Chuah, Teck Hu, W. Luo; "UMTS Release 99/4 Airlink Enhancement for Supporting MBMS Services"; IEEE 2004; pp. 3231-3235.

Patrick Hosein, Tao Wu; "Dynamic Power Headroom Threshold for Mobile Rate Determination in A CDMA Network"; IEEE 2004; pp. 2404-2408.

Japan Office Action for Application No. 2009-193441 dated Apr. 10, 2012, 2 pages.

* cited by examiner

WIRELESS TRANSMITTER CONFIGURATION

FIELD OF THE DISCLOSURE

The present disclosure relates generally to wireless communications, and more particularly to configuring wireless transmitters based on one of transmitter power related information, current transmitter configuration information, and soft handoff information, among other information, transmitter devices and methods.

BACKGROUND OF THE DISCLOSURE

In wireless communication applications, generally, power amplifiers are designed, e.g., sized and tuned, to accommodate worst case signals and/or transmitter configurations while meeting in-band and out-of-band distortion requirements. Designing amplifiers having increased output power to avoid higher inter-modulation (IM) distortion levels, for example, to achieve a required Adjacent Channel Leakage Ratio (ACLR), increases current drain, which results in greater heat dissipation and reduced battery life in mobile terminals.

In some wireless communication networks, certain mobile device transmitter channel configurations result in higher power amplifier (PA) inter-modulation (IM) distortion when the PA has inadequate headroom. The IM distortion may be indicated by peak-to-average ratio (PAR) information or by some other metric correlated to the distortion levels. The PA headroom is a measure of the power margin available for producing higher levels of RMS output power for a given reference signal or transmitter configuration, and/or for amplifying signals having a higher peak-to-average power ratio (PAR) at a maximum rated RMS power level.

It has been proposed to schedule around mobile device transmitter configurations corresponding to certain data rates or transport-format combinations (TFCs) that would increase inter-modulation distortion (IMD) beyond a threshold.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
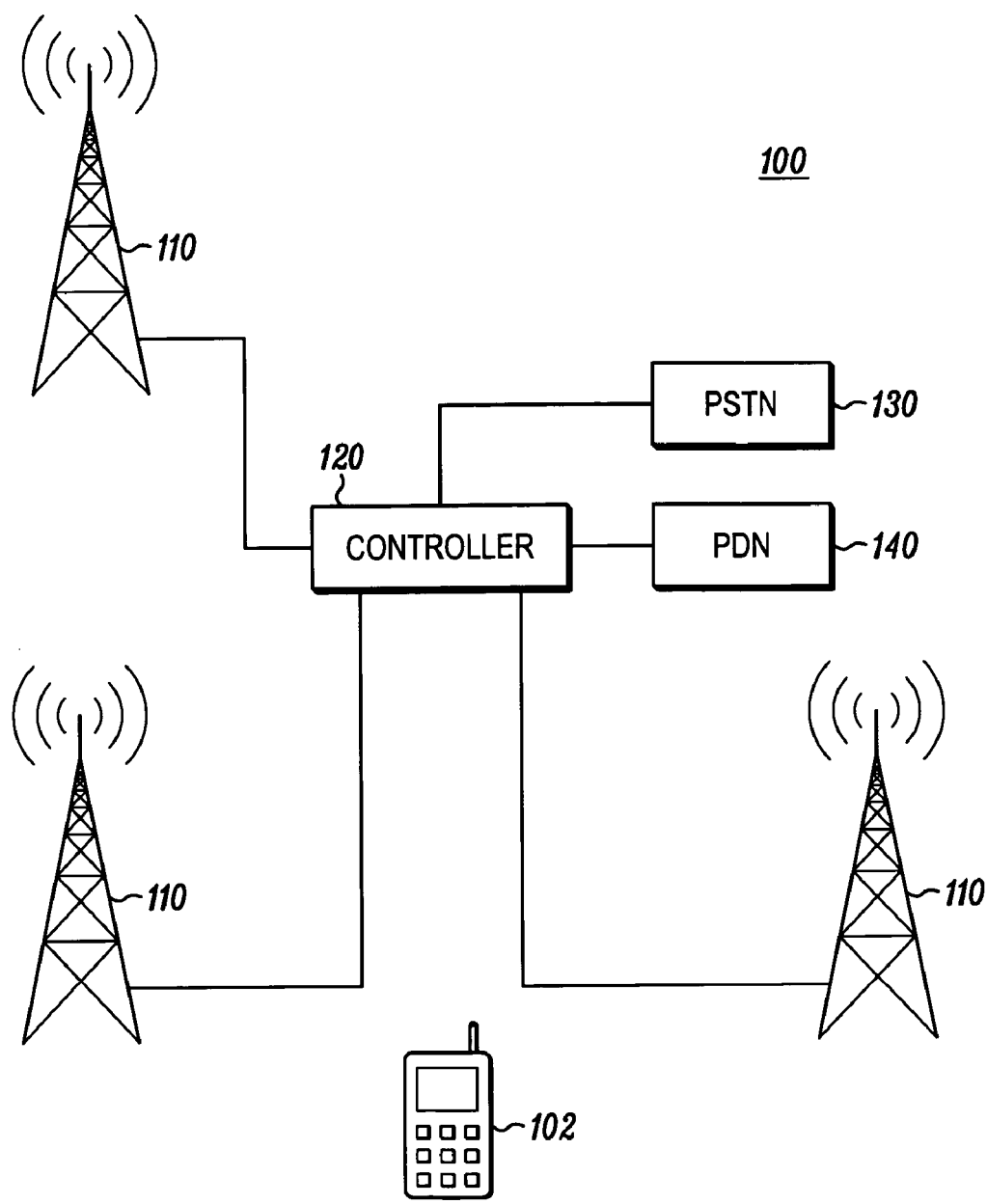
FIG. 1 illustrates an exemplary wireless communication system.

FIG. 1 illustrates an exemplary wireless cellular communication network 100 comprising multiple base stations 110 distributed over a geographical region divided into cells served by a corresponding base station. The base stations are communicably interconnected by a controller 120 that is typically coupled via gateways to a public switched telephone network (PSTN) 130 and to a packet data network (PDN) 140. The network also comprises management functionality including data routing, admission control, resource allocation, subscriber billing, terminal authentication, etc., which may be controlled by other network entities, as is known generally by those having ordinary skill in the art. Mobile wireless devices, for example, terminal 102, communicate voice and/or data with each other and with devices on other networks, for example, the PSTN or PDN, via the network 100 as is also known generally by those having ordinary skill in the art.

In one embodiment, the cellular network is a $3^{rd}$ Generation Partnership Project (3GPP) Universal Mobile Telecommunications System (UMTS) W-CDMA network, wherein the base station is referred to as a Node-B, the controller is referred to as a radio network controller (RNC), and the mobile terminal is known as user equipment (UE). In W-CDMA systems, mobile devices are allocated different spreading and scrambling codes on a common carrier frequency. The transmissions are spread by multiplication with the allocated codes, which spread the signal over a wide bandwidth. At the receiver, the codes are used to de-spread received signals thereby regenerating the original signal. Each base station has a code dedicated for a pilot signal and a broadcast signal, and mobile stations use these signals to select a serving cell. In other embodiments, the network may have some other form and/or may be implemented according to some other communication protocol, for example, a future generation protocol.

In one embodiment, the wireless transmitter signals for a change in channel configuration based on one or more of transmitter power related information, current transmitter configuration, for example, transport format related information, and soft handoff information, among other information. The transmitter channel configuration is, for example, any one or more of the number of different physical channels and choice of channelization code for each channel, frame size, gain level of each channel, time and code multiplexing of the channels, spreading factor of each channel, the assigned modulation branch of each channel and any other pertinent associated modulation and coding parameter. In one embodiment, the transmitter requests the change in channel configuration by signaling to a wireless communication network, for example, in a Layer 1 (physical layer) or Layer 3 message. In other embodiments, the transmitter configures the channel locally, for example, the transmitter may be part of a mobile wireless terminal, such that the reconfiguration request is to a local processor capable of the reconfiguration, assuming that the UE is capable of determining the channel configuration and reconfiguring the channel.

3 G communication systems include a high speed downlink data service known as the High Speed Downlink Packet Access (HSDPA) service, and a high speed uplink data service known as High Speed Uplink Packet Access service (HSUPA). HSDPA and HSUPA provide modified modulation formats and code rates in response to dynamic variations in the radio environment. HSDPA and HSUPA also use a retransmission scheme known as Hybrid Automatic Repeat reQuest (H-ARQ) wherein incremental redundancy is provided by soft combining data from the original transmission and any packet retransmissions.

Packet service subscribers expect uniformity of data rates throughout the cellular coverage area including at the cell edge. Current 3 G communication system deployments support 64 Kbps at the cell edge, which are typically soft handoff (SHO) regions, based on 10 ms or 20 ms transmission time intervals (ITT). For the transmission of a particular information bit block size (TBS), additional power is generally required for a smaller frame size, for example, a 2 ms TTI, relative to that required for a larger frame size, for example, a 10 ms TTI. Also, IM distortion tends to increase with code multiplexing. In HSUPA, for example, the enhanced dedicated physical control channel (E-DPCCH) is code multiplexed with the enhanced dedicated physical data channel (E-DPDCH). IM distortion is thus generally dependent on the modulation format, for example, code division multiplexing (CDM) the E-DPDCH/E-DPCCH with a 10 ms TTI or time division multiplexing (TDM) E-DPDCH/E-DPCCH with a 10 ms TTI.

In some applications, for a particular information bit block size (TBS), increasing the frame size can reduce the power requirement and/or reduce IM distortion. In the exemplary 3 G communication system, for example, use of a 10 ms TTI instead of a 2 ms at the cell edge reduces the power due to increased processing gain made available by the increased frame size. For example, sending 640 bits in a 10 ms TTI requires a 64 Kbps data rate while sending 640 bits in a 2 ms TTI requires a 320 Kbps data rate. In this example, for the same Block Error Rate (BLER), the 5 ms TTI decreases the required power level by a factor of 5 relative to the 2 ms TTI. With Hybrid ARQ, the power levels for a given data rate can be decreased for both the 10 ms and 2 ms TTI cases due to being able to target higher BLER. The benefit is larger for the smaller TTI case but not enough to compensate for certain minimum data rate/frame size combinations with CDM multiplexing. At near higher power levels for E-DPDCH/E-DPCCH code division multiplexed applications, the E-DPCCH power gain can be lowered more relative to the DPCCH power gain for a 10 ms TTI than for a 2 ms TTI. The reduction in power gain results in a PAR reduction and allows a relative maximum output power level increase, thereby achieving higher data rate, for example, at the edge of the coverage area or cell. Thus in some embodiments, the UE requests a change in frame size based on a condition monitored by the UE, as suggested above. Alternatively, the frame size may be changed by the network, for example, by the Node-B 110 in FIG. 1, based on information received from the UE and/or from the RNC, as discussed more fully below.

Figure 2:
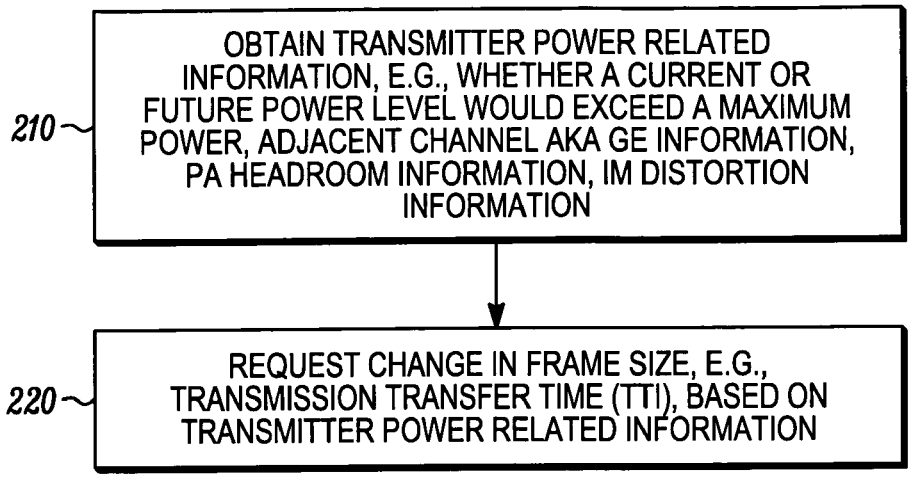
FIG. 2 illustrates an exemplary process flow diagram.

In one particular implementation, illustrated in the process diagram 200 of FIG. 2, at block 210, the UE obtains transmitter power related information, for example, whether a current or future required power level of the UE would exceed a maximum power level of the UE power amplifier (PA). Another example of transmitter power related information is whether the current or future required PA power level would cause the UE's adjacent channel leakage ratio (ACLR) to exceed a specified level. This latter information may be obtained from a look-up table stored on the UE. The power related information may also be a measure of transmitter headroom and/or IM distortion. The UE may monitor IM distortion based on changes in the peak to average power ratio (PAR) or some other metric that correlates with IM distortion. The IM distortion may also be determined indirectly using look-up tables that map IM distortion to the channel configuration or alternatively based on a set of rules like those established in the 3GPP, Release 5 specification based on Bc/Bd breakpoints and Bhs values.

In FIG. 2, at block 220, the UE requests the change in channel configuration, for example, frame size, based on power related information of the transmitter. For example, the decision to change the frame size may be based upon whether a current or future required power level of the UE would exceed a maximum power level of the UE power amplifier (PA). Alternatively, the frame size change may be based upon whether the current or future required PA power level would cause the UE's adjacent channel leakage ratio (ACLR) to exceed a specified level. In another embodiment, the frame size change is based upon transmitter headroom information, for example, the UE may signal for an increase in frame size when the headroom decreases below a predetermined level. In another embodiment, the frame size change is based upon IM distortion, for example, the UE signals for a frame size increase as the IM distortion increases above a predetermined level. In another embodiment, the frame size change is also based on the mobile device transmitter configuration alone or in combination with the transmitter power-related information. Generally, any one or more of the power related criteria may be used, alone or in combination, as a basis for dynamically changing the frame size. As suggested above, however, the channel configuration change may also be based on other criteria, including current or past channel configuration, transport format, and soft handoff as discussed further below.

In one example, the frame size could be increased in situations where any corresponding increase in latency is outweighed by maintenance of the existing data rate or an increase in the data rate. The controller, for example, RNC, would make the final decision on whether to change the frame size in response to the request. The network may signal frame size changes to the UE via Layer 1 or Layer 3 signaling. The network generally signals the UE to change frame size, for example, TTI, at an activation time.

In one embodiment, a wireless communication infrastructure entity, for example, the base station or Node-B obtains one of power related information, transport format related information, or soft handoff information for a mobile wireless communication device. The base station then configures a channel for the mobile wireless communication device based on one of the power related information, the transport format related information, and the soft handoff information.

In one embodiment, for example, the Node-B configures the E-DCH TTI size based on power margin feedback information, SHO state information, and/or estimated PAR information (based on inferred mobile device transmitter configuration from received E-TFCI) in order to control the UE power amplifier PAR and maximum power levels. "Time and Rate" scheduling refers to an active set Node-B scheduling grants to control the rate or power levels and the scheduling time interval of the UE. The scheduling interval is the time interval over which the UE is permitted to transmit. The UE receives periodic or event based power margin feedback and buffer occupancy information from the Node-B. The network entity, for example, Node-B, may estimate the PAR of the UE based on look-up tables or based on enhanced-transport format combination indicator (E-TFCI) values received from the UE. "Rate control" scheduling refers to an active set Node-B signaling to control an attribute used by the UE to determine its transmission rate or power level while not directly determining UE transmission start times or transmission duration.

In other another embodiment, the base station could infer the transmitter's IM distortion level or whether it would be exceeded based on information from the transmitter, and then schedule around mobile device transmitter configurations that increase IM distortion beyond a threshold. The information from the transmitter could be power status and transport format information, e.g., the rate indicator or transport format related information or transport format combination indicator, indicating the rate, modulation and other transmitter configuration information related to uplink transmissions. Alternatively, the transmitter could determine whether to transmit with a particular configuration based on whether its IM distortion power level would be exceeded. Other possibilities are to change the transmission characteristics such as the number of transmissions targeted per packet based on using an N-channel stop-and-wait Hybrid ARQ protocol.

In FIG. 1, as the UE, for example, terminal 102, moves from one cell to another, it enters regions of overlapping coverage by more than one base station. Within these overlapping regions, the UE is supported by more than one base station, or cell site, in a state referred to as soft handoff (SHO). Generally, SHO also refers to situations where the UE is supported by more than one sector, sometime also referred to as a cell, of a particular base station. A serving cell is an active set cell from which a UE receives grants and other signaling. An active set cell is a cell with which the UE is currently communicating. Multiple cells are likely to be in the active set when a UE is in a multi-coverage region, which is typically referred to as a soft handoff region, for example, near the cell boundary or edge, where the UE simultaneously communicates with more than one active set cell. When a new cell is added to the active set in addition to one or more other pre-existing cells in the set, the UE is in soft handoff (SHO).

Figure 3:
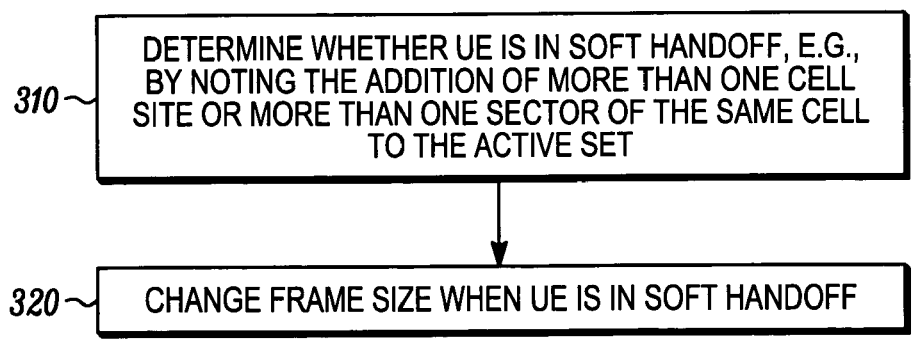
FIG. 3 illustrates another exemplary process flow diagram.

In another embodiment, the frame size is changed based on whether the UE is in soft handoff. In the exemplary process flow diagram 300 of FIG. 3, at 310, a determination is made as to whether the UE is in soft handoff. In one embodiment, this determination is made at the UE, and in another embodiment the determination is made at the network, for example, at radio network controller (RNC). The UE maintains the active cell set. An active cell set including more than one separate cell site or more than one sector from the same cell is indicative of soft handoff. In FIG. 3, at block 320, the frame size is changed when the active set of cells includes more than one cell. In one embodiment, the UE requests a change, for example an increase, in frame size when the active cell set includes more than one cell site. The UE may also request a decrease in the frame size when the UE is no longer in handoff, for example, when the active cell set is configured from having cells from more than one cell site to having at least one cell from a single cell site. Generally, SHO implies that the UE is near the cell edge where a larger TTI size may be warranted to meet power or IM or ACLR requirements for a specific rate and mobile device transmitter configuration.

In embodiments where the UE request the frame size change, the UE signals the network using Layer 1 and Layer 3 signaling. The controller, for example, the RNC, would make the final decision on whether to change the frame size. In some embodiments, the network may automatically increase the frame size when the UE enters soft handoff. Some networks, for example, 3GPP, Release 6 protocols, know the SHO state of the UE. In some embodiments, the network may also consider the UE transmitter configuration in addition to the SHO status of the UE before changing the frame size. In either case, the network may signal frame size changes to the UE via Layer 1 or Layer 3. The network generally signals the UE to change its frame size, for example, TTI, at an activation time.

In some embodiments, it may be desirable to limit the frequency of a transmitter channel configuration change to avoid degrading the benefit obtained from such a change. Some sort of hysteresis can be included when determining transmitter channel configuration changes, for example, based on the time between changes and/or by filtering the events used for triggering the transmitter channel configuration changes to reduce the likelihood of triggering an unnecessary change.

Thus data rate coverage is maintained and/or increased at the cell edge without the need for a larger power amplifier by selecting the appropriate multiplexing, for example, CDM or TDM, and frame size, for example, 2 ms or 10 ms TTI, on the enhanced uplink data and enhanced uplink control channels. In the exemplary HSUPA application, switching the frame size between 2 ms TTI and 10 ms TTI increases coverage due to the sustained higher data rates that can be achieved for a given delay when using all N-channels of the Hybrid ARQ protocol and when using only a single HARQ channel (burst data rate).

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication infrastructure entity comprising:
    a transceiver;
    a processor coupled to the transceiver,
    the wireless communication infrastructure entity configured to receive enhanced transport format combination indictor (E-TFCI) information and transmit power related information from a mobile wireless communication device served by the wireless communication infrastructure entity,
    the transmit power related information includes power amplifier headroom;
    the processor configured to configure a transmitter channel configuration for the mobile wireless communication device based on the E-TFCI information and the transmit power related information received from the mobile wireless communication device.

2. The entity of claim 1, the processor configuring the transmitter channel configuration by changing channel frame size.

3. The entity of claim 2, the processor configured to change the channel frame size based on current transmitter channel configuration information for the mobile wireless communication device.

4. The entity of claim 1, the processor configured to configure the transmitter channel configuration for the mobile wireless communication device by configuring for either code or time multiplexing.

5. The entity of claim 1, the processor configured to configure the transmitter channel configuration for the mobile wireless communication device by configuring a number of physical channels and modulation and coding parameters of the mobile wireless communication device.

6. A mobile wireless communication device comprising:
    a transceiver;
    a processor coupled to the transceiver,
    the mobile wireless communication device configured to obtain enhanced transport format combination indictor (E-TFCI) information and transmit power related information for the mobile wireless communication device,
    the transmit power related information includes power amplifier headroom;
    the processor configured to configure a transmitter channel configuration of the mobile wireless communication device based on the E-TFCI and the transmit power related information for the mobile wireless communication device and scheduling grants;
    transmitting with the transmitter channel configuration.

7. The device of claim 6, the processor configured to configure the transmitter channel by changing channel frame size.

8. The device of claim 7, the processor configured to change the channel frame size based on current transmitter channel configuration information for the mobile wireless communication device.

9. The device of claim 6, the processor configured to configure the transmitter channel configuration by configuring for either code or time multiplexing.

10. The device of claim 6, the processor configured to configure the transmitter channel configuration by configuring a number of physical channels.

11. The device of claim 10, the processor configured to change the number of physical channels based on current transmitter channel configuration information for the mobile wireless communication device.

12. The device of claim 6, the processor configured to configure the transmitter channel configuration by configuring modulation and coding parameters of the mobile wireless communication device.

13. The device of claim 12, the processor configured to change the modulation and coding parameters of each channel based on current transmitter channel configuration information for the mobile wireless communication device.

14. The device of claim 6, the processor configured to configure the transmitter channel configuration by configuring channelization code and spreading factor of the mobile wireless communication device.

15. The device of claim 6, the mobile wireless communication device configured to obtain the E-TFCI information and transmit power related information for the mobile wireless communication device based on a scheduling grant received by the mobile wireless communication device.

* * * * *